United States Patent
McCarthy et al.

(10) Patent No.: US 10,013,732 B2
(45) Date of Patent: Jul. 3, 2018

(54) EXTERNALLY DIRECTED GPU DATA

(71) Applicant: Lockheed Martin Corporation, Bethesda, MD (US)

(72) Inventors: Robert C. McCarthy, Orlando, FL (US); Zachary J. Heylmun, Orlando, FL (US); Hong Phuoc Nguyen, Orlando, FL (US); Howell B. Hollis, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1027 days.

(21) Appl. No.: 13/930,367

(22) Filed: Jun. 28, 2013

(65) Prior Publication Data

US 2015/0002521 A1    Jan. 1, 2015

(51) Int. Cl.
*G06T 1/00* (2006.01)
*G06T 1/20* (2006.01)

(52) U.S. Cl.
CPC ...................... *G06T 1/20* (2013.01)

(58) Field of Classification Search
CPC ............. G06T 1/20; G06T 15/50–15/87
See application file for complete search history.

(56) References Cited

U.S. PATENT DOCUMENTS

| | | | |
|---|---|---|---|
| 7,095,416 B1 * | 8/2006 | Johns et al. | 345/522 |
| 7,533,371 B1 * | 5/2009 | Johns et al. | 717/130 |
| 8,436,864 B2 * | 5/2013 | Aguaviva et al. | 345/506 |
| 8,773,433 B1 * | 7/2014 | Smyrl | G06T 15/506 |
| | | | 345/420 |
| 2008/0001952 A1 * | 1/2008 | Srinivasan et al. | 345/502 |
| 2008/0141131 A1 * | 6/2008 | Cerny et al. | 715/716 |
| 2011/0087864 A1 | 4/2011 | Duluk, Jr. et al. | |
| 2012/0081377 A1 * | 4/2012 | Sowerby et al. | 345/522 |

OTHER PUBLICATIONS

Duca et al., A Relational Debugging Engine for the Graphics Pipeline, ACM Transactions on Graphics—Proceedings of ACM SIGGRAPH 2005, vol. 24, Issue 3, Jul. 2005, pp. 453-463.*
Author Unknown, "Graphics card architecture," High End PC Systems, 2012, http://i-am-fast.com/GraphicCardsArchitecture.aspx, 4 pages.

* cited by examiner

*Primary Examiner* — Charles Tseng
(74) *Attorney, Agent, or Firm* — Withrow & Terranova, PLLC

(57) ABSTRACT

Mechanisms for externally directing graphics processing unit data are disclosed. A simulator module includes an external application interface that is configured to communicate with an external application that is independent of the simulator module. The simulator module is configured to receive from the external application via the external application interface first user data and provide the first user data to a graphics processing unit (GPU) for use by a first shader function for image rendering during a first period of time. The simulator module continuously generates simulation data associated with a simulation and provides the simulation data to the GPU for the image rendering during the first period of time.

11 Claims, 7 Drawing Sheets

EXTERNALLY DIRECTED GPU DATA

TECHNICAL FIELD

The present embodiments relate to providing user data to a graphics processing unit (GPU), and in particular to facilitating, by a simulator module, the use by a GPU of user data provided by an external application during image rendering.

BACKGROUND

The generation of high-resolution imagery is typically performed by a separate graphics processing unit (GPU) that interfaces with a central processing unit (CPU) of a device. Applications, such as, by way of non-limiting example, simulation applications, that provide highly detailed, high-resolution, high-framerate imagery on a display typically execute on a CPU and interface with a GPU via a graphics library, such as DirectX®, OpenGL® or OpenGL ES®. A graphics library, in turn, interfaces with the GPU through device drivers that are provided by the vendor of the GPU.

GPUs are increasingly programmable and allow an application to provide the GPU with one or more shaders, referred to herein as shader functions, that may then be executed by the GPU during the process of rendering an image. Various types of shader functions may be provided, including, for example, vertex shader functions, geometry shader functions, pixel shader functions, hull shader functions, and domain shader functions. Each shader function may utilize data that is stored in one or more constant buffers on the GPU during the rendering process to render an image. The format and ordering of the data in the constant buffers is typically unique and specific to the particular shader function.

A GPU and associated rendering pipeline are optimized to facilitate the generation of high-resolution images at a relatively high-frequency, such as hundreds of frames per second. A shader function may be called millions of times during the generation of each frame, and during each call the shader function may access the constant buffers that contain data for that shader function. Even the most trivial mismatch between what a shader function expects and what is in the constant buffers could result in data being rendered improperly or not rendered at all. In some cases it could even cause a degradation in performance or a crash in the graphics driver. Consequently, the data stored in the constant buffers is tightly controlled by the application responsible for the rendering of images, in this example, the simulation application.

Complex applications such as simulation applications are often manufactured by entities that specialize in the manufacture and support of such applications and are sold or licensed to third parties for use in training and the like. In some instances, it may be desirable to the third party to alter in some fashion the rendered imagery generated by the simulation applications, such as, for example, by altering the output of one or more shader functions based on the data in the constant buffers.

SUMMARY

The present embodiments relate to a simulator module that receives user data from an external application and directs a graphics processing unit (GPU) to utilize the user data during image rendering. In one embodiment, the simulator module includes an external application interface that is configured to communicate with the external application. The external application is independent of the simulator module. The phrase "independent of" refers to a separate application than that of the simulator module, one, for example, that comprises a different code base from the simulator module. The simulator module is configured to receive first user data from the external application via the external application interface. The simulator module provides the first user data to the GPU for use by a first shader function for image rendering during a first period of time. The simulator module continuously generates simulation data associated with a simulation and provides the simulation data to the GPU for the image rendering during the first period of time.

Among other advantages, the embodiments allow a first entity that has purchased or licensed a simulator module manufactured by another entity to develop an external application that can, via the simulator module, direct a GPU to utilize user data from the external application during the rendering process. Thus, the first entity can, at least in part, directly tailor or otherwise alter the output of one or more shader functions.

In one embodiment, the simulator module directs the GPU to bind the first user data to a rendering pipeline for use by the first shader function for image rendering during the first period of time. The simulator may be configured to communicate with a graphics library, such as a DirectX®, OpenGL® or OpenGL ES® library, to direct the GPU to bind the first user data to the rendering pipeline.

In one embodiment, the simulator module is configured to receive second user data from the external application via the external application interface. The simulator module provides the second user data to the GPU for use by a second shader function for image rendering during the first period of time, and continuously generates the simulation data associated with the simulation and provides the simulation data to the GPU for the image rendering during the first period of time. Thus, the simulator module may allow an external application to provide different user data for different shader functions executing concurrently on the GPU.

In one embodiment, a device is provided. The device includes a memory, and a processor coupled to the memory. The processor is configured to initiate a simulator module that includes an external application interface configured to communicate with an external application that is independent of the simulator module. The simulator module is configured to receive first user data from the external application via the external application interface, and provide the first user data to a GPU for use by a shader function for image rendering during a first period of time. The simulator module is also configured to continuously generate simulation data associated with a simulation and provide the simulation data to the GPU for the image rendering during the first period of time.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present embodiments relate to a simulator module that facilitates the use of user data provided by an external application by a shader function executing on a graphics processing unit (GPU). Among other features, the present embodiments allow a first entity that has purchased or licensed a simulator module manufactured by another entity to develop an external application that can, via the simulator module, direct the GPU to utilize the user data that was provided by the external application during a rendering process. Thus, the first entity can, at least in part, directly tailor or otherwise alter the output of one or more shader functions that are controlled by the simulator module.

Figure 1:
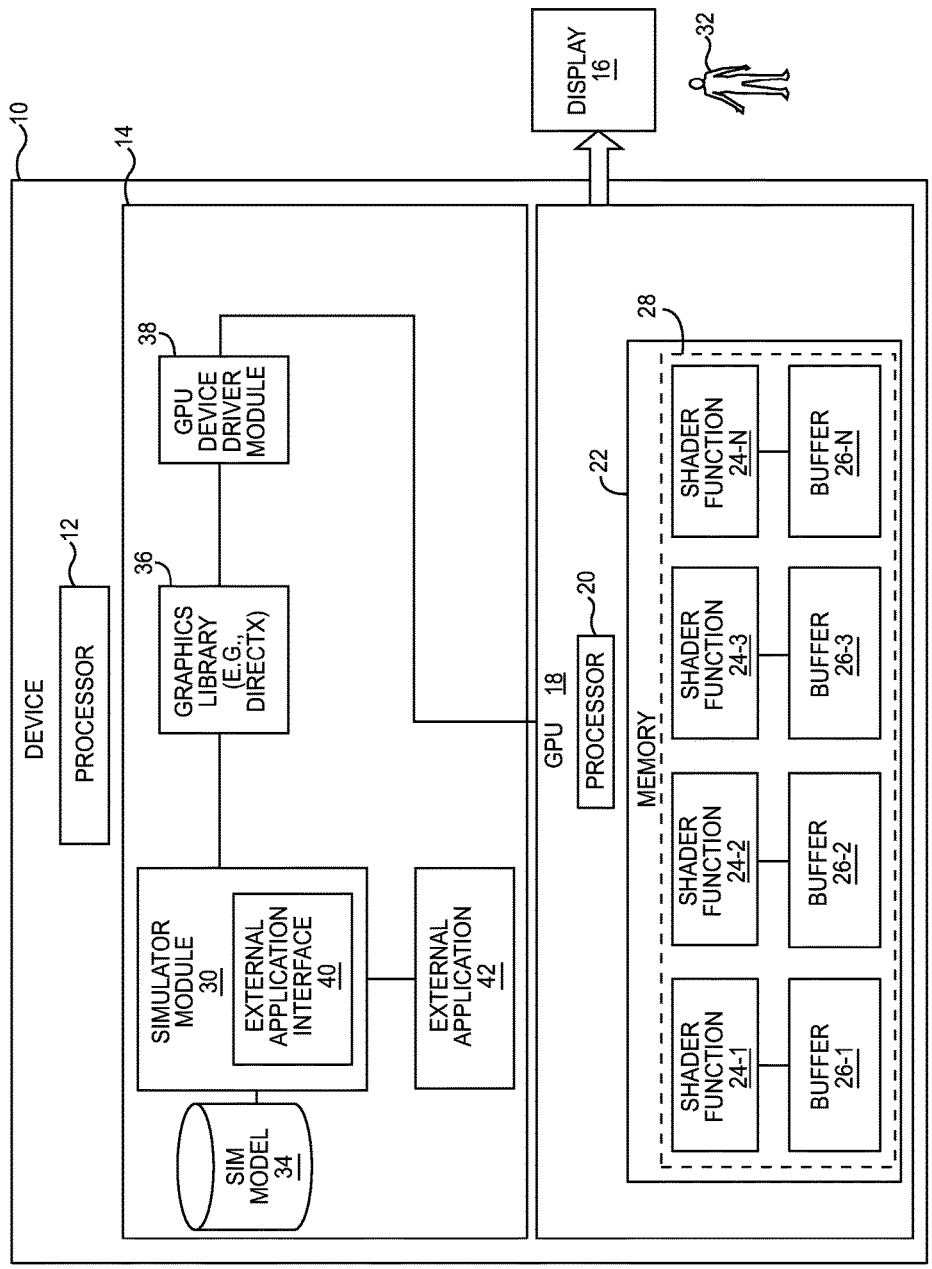
FIG. 1 is a block diagram of a device according to one embodiment.

FIG. 1 is a block diagram of a device 10 according to one embodiment. The device 10 may be any suitable computing device capable of implementing the functionality discussed herein, such as a workstation computing device, laptop computing device, special purpose simulation computing device, gaming console computing device, or the like. The device 10 includes one or more processors 12, which is coupled to a memory 14. The device 10 visualizes a simulation, as discussed in greater detail herein, on a display 16. The display 16 may comprise any suitable display technology, such as a projector, flat-panel monitor, integrated LCD screen, or the like.

The device 10 includes, or is coupled to, a graphics processing unit (GPU) 18. The GPU 18 includes one or more processors 20, which are communicatively coupled to a memory 22. In operation, the GPU 18 may comprise a plurality of shader functions 24-1-24-N (generally, shader functions 24). Each shader function 24 may be coupled to one or more buffers 26-1-26-N (generally, buffers 26). The shader functions 24 and buffers 26 are part of what is commonly referred to as a rendering pipeline 28, which, generally, is the process utilized by the GPU 18 to render imagery for presentation on the display 16. The buffers 26 may be referred to by different terminology, but are sometimes referred to as constant buffers.

According to one embodiment, in operation, the memory 14 includes a simulator module 30. The simulator module 30 may comprise any suitable simulation application, such as a flight simulator, ground vehicle simulator, or the like. The simulator module 30 controls a simulation that is perceived by a user 32 on the display 16. The imagery provided on the display 16 may in part be based on inputs received from the user 32. For example, the user 32 may control an input device such as a joystick (not illustrated), that, as manipulated, alters the view of the simulated environment seen by the user 32.

The simulator module 30 maintains a simulation model 34 that comprises information about the simulated environment. The information may describe the objects in the simulation, including the location of each object, state information about each object, view frustums of objects that may be portrayed on the display 16, and the like. Thus, as the user 32 manipulates the input device, the simulator module 30 may continually update the simulation model 34 to reflect changes in the simulated environment, such as, for example, the current view of the user 32. Although not illustrated, the device 10 may be coupled to other devices 10 that include a simulator module 30, and may exchange information with such devices 10 such that the simulation model 34 remains synchronized with that of the simulation model 34 associated with the other devices 10.

During a simulation, the simulator module 30 accesses the simulation model 34 and provides simulation data from the simulation model 34 to the GPU 18 for rendering the imagery presented on the display 16. This process may happen relatively continuously at a relatively rapid rate, such as 30 or 60 cycles per second. The simulation data may differ each cycle based on movement of objects in the simulation, such as movement of objects that represent participants, movement of simulated objects, movement of things due to environmental factors, such as weather, and the like.

The simulator module 30, in one embodiment, communicates with the GPU 18 through one or more intermediate modules, including, by way of non-limiting example, a graphics library 36, such as a DirectX® graphics library, OpenGL® graphics library, OpenGL ES graphics library or the like. The graphics library 36, in turn, interfaces with the GPU 18 through a GPU device driver module 38 that is typically provided by the vendor of the GPU 18. The use of such intermediate modules such as the graphics library 36 and the GPU device driver module 38 allows the simulator module 30 to interoperate with different types of GPUs 18 without modification of the simulator module 30.

In one embodiment, the simulator module 30 includes an external application interface 40 that is configured to communicate with one or more external applications 42. The external application interface 40 may comprise any suitable interprocess communications (IPC) mechanism, including, by way of non-limiting example, an application programming interface (API), which may be in the form of a plug-in architecture, or a network-facing interface that facilitates communication between the simulator module 30 and an external application executing on a remote computer via a network, or any other type of IPC mechanism. The external application 42 comprises any application that is independent of the simulator module 30. The phrase "external application" refers to an application that is independent of the simulator module 30, such as having a different codebase, executing on a different machine, or the like. In one embodiment, the external application 42 is developed by an entity that is different from the manufacturer of the simulator module 30, and thus does not have access to the source code of the simulator module 30.

Figure 2:
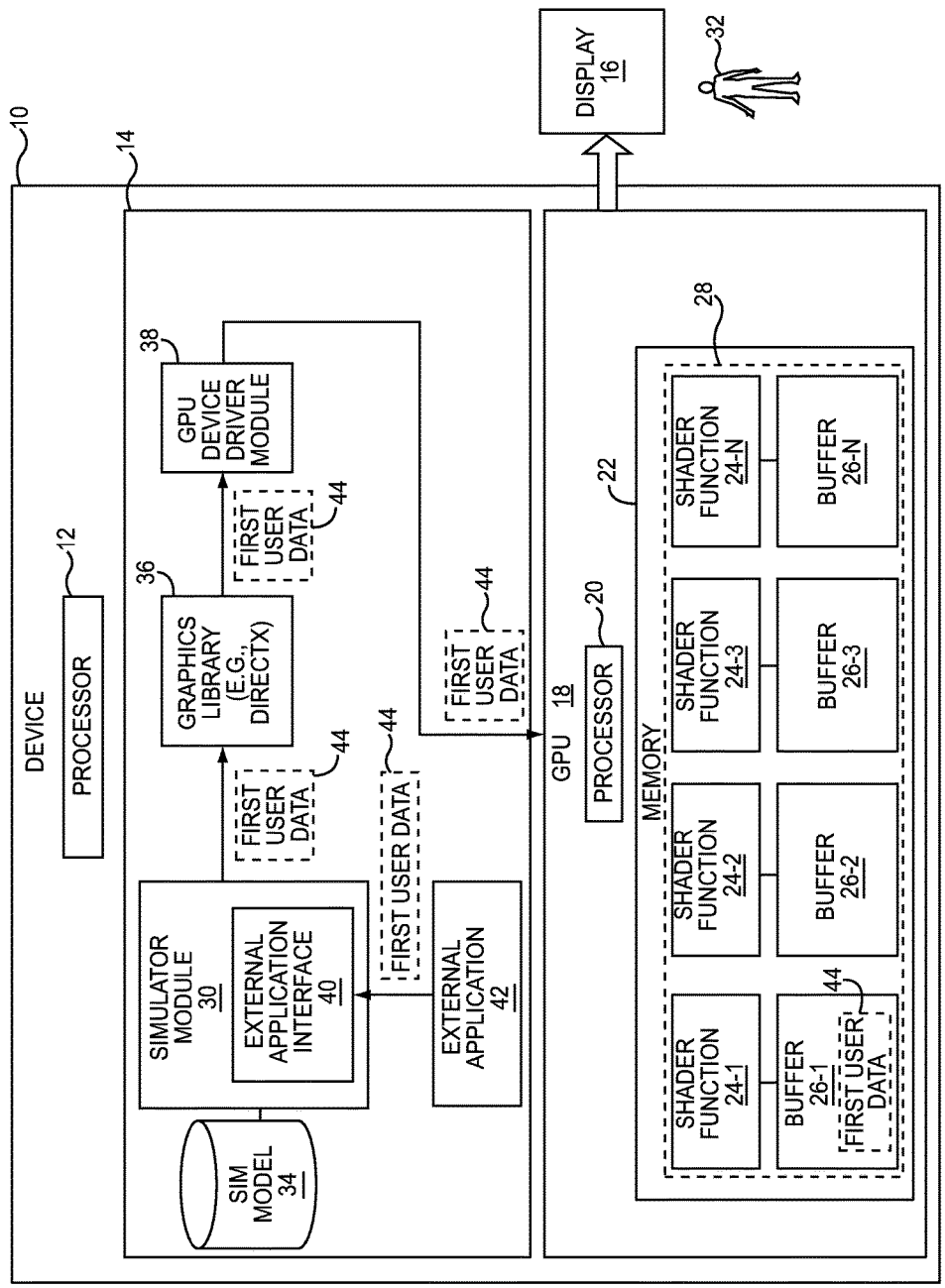
FIG. 2 is a block diagram illustrating a data flow according to one embodiment.
Figure 3:
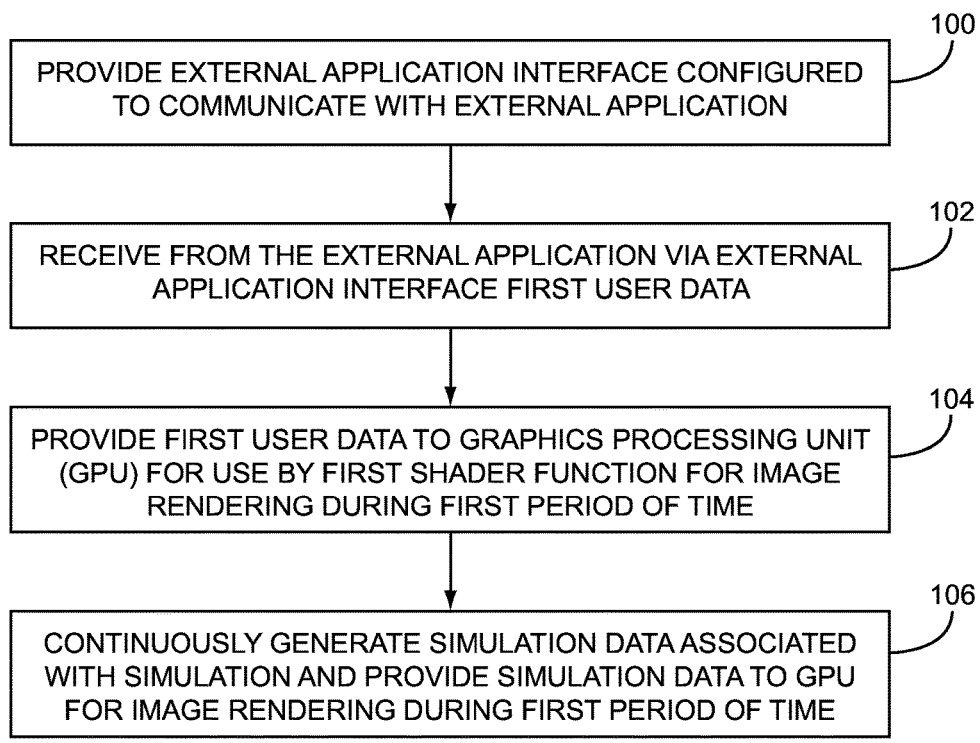
FIG. 3 is a flow chart of a method for directing a GPU to utilize user data received from an external application according to one embodiment.

FIG. 2 is a block diagram illustrating a data flow according to one embodiment. FIG. 3 is a flow chart of a method for facilitating the use of user data by the GPU 18 that is provided by the external application 42 according to one embodiment. FIGS. 2 and 3 will be discussed together. Referring first to FIG. 2, typically during an initialization phase of the simulator module 30, the simulator module 30 interfaces with the graphics library 36 and engages in a protocol for obtaining access to the GPU 18. The particular protocol may differ depending on the particular graphics library 36, but generally involves obtaining information, such as a unique identifier, or one or more references to certain memory addresses, that allows the graphics library 36 to control access to the GPU 18 to ensure that two modules executing on the device 10 do not inadvertently attempt to utilize the GPU 18 for rendering purposes simultaneously. With reference to a DirectX® graphics library 36, such protocol involves the simulator module 30 receiving a reference to a virtual device from the graphics library 36 that is subsequently used by the simulator module 30 to communicate with the GPU 18 via the graphics library 36. No other module or application executing on the device 10, including, for example, the external application 42, is provided the same virtual device as that provided to the simulator module 30, to ensure that the external application 42 cannot communicate with the GPU 18 at the same time the simulator module 30 is utilizing the GPU 18, and cannot modify resources associated with the simulator module 30.

At some point during the operation of the simulator module 30, the simulator module 30 may provide to the GPU 18 one or more shader functions 24 for execution on the GPU 18 during rendering processes. The shader functions 24 may be called by the processor 20 as part of the rendering pipeline 28, to, for example, aid in rendering imagery for presentation on the display 16.

Referring now to FIG. 3, the simulator module 30 provides the external application interface 40, which is configured to communicate with the external application 42 (FIG. 3, block 100). The simulator module 30 receives first user data 44 from the external application 42 via the external application interface 40 (FIG. 3, block 102). The simulator module 30 provides the first user data 44 to the GPU 18 for use by a first shader function 24-1 for image rendering during a first period of time (FIG. 3, block 104). The first period of time may be relatively short, such as seconds, or may encompass the entire duration of the simulation. During the first period of time, the simulator module 30 generates simulation data maintained in the simulation model 34 and provides the simulation data to the GPU 18 for image rendering (FIG. 3, block 106). Also during the first period of time, the simulator module 30 may repeatedly callback the external application 42 to receive new first user data 44 and repeatedly provide the new first user data 44 to the GPU 18 for use by the first shader function 24-1 for image rendering during the first period of time. For example, the external application 42 may provide different new first user data 44 for different objects being rendered in a scene. During execution of the rendering pipeline 28, the first shader function 24-1 accesses the first user data 44 in the buffer 26-1 to alter the imagery being rendered for presentation on the display 16.

The first user data 44 may comprise any data that may be utilized by the first shader function 24-1 during the rendering of the imagery. For example, the first user data 44 may comprise state information about a lighting environment in the simulation, provide information that allows the first shader function 24-1 to select a particular texture of a plurality of different textures to use for imagery associated with a particular object in the simulation based on a particular state of the object, provide temperature values for use in an infra-red sensor simulated object, or may comprise factors to be used in a blur kernel.

In other embodiments, the first user data 44 may comprise an integer texture index for texture swapping, or material constants such as temperature that might vary over time, or a set of parameters describing the lighting environment for a portion of a volumetric cloud. In yet other embodiments, the first user data 44 may provide additional state information about an object such as if the object has been damaged and what kind of damage the object has taken, or if the object has gotten wet and how wet the object has become, or the first user data 44 may comprise a list of lights which could be used to more realistically light an object or scene. In other embodiments, the first user data 44 may comprise detailed information about the current environment, such as the weather, wind, temperature, pressure, and the like, or may comprise level of detail information which may be used to disable certain portions of the respective shader function to improve performance when objects are farther away or when the system is running slower than desired.

The first user data 44 may comprise any format and content, as expected by the first shader function 24-1. Table 1 provides an example of a structure of the first user data 44 according to one embodiment relating to lighting parameters.

TABLE 1 struct LightingParams
{
    float LightDirectionX;
    float LightDirectionY;
    float LightDirectionZ;
    float LightDiffuseColorR;
    float LightDiffuseColorG;
    float LightDiffuseColorB;
    float LightDiffuseIntensity;
    float LightSpecularColorR;
    float LightSpecularColorG;
    float LightSpecularColorB;
    float LightSpecularIntensity;
};

Table 2 illustrates a more generic structure of the first user data 44 according to one embodiment.

TABLE 2 struct CustomConstantData
{
    float float0;
    float float1;
    float float2;
    float float3;
    float float4;
    float float5;
    float float6;
    float float7;
    float float8;
    float float9;
    float float10;
    float float11;
    float float12;
    float float13;

TABLE 2-continued

```
    float float14;
    float float15;
};
```

The particular mechanism for providing the first user data 44 to the GPU 18 and indicating that the first user data 44 is for use by the first shader function 24-1 may differ based on the particular graphics library 36. In one embodiment, the simulator module 30 directs the GPU 18 to bind the first user data 44 to the rendering pipeline 28 for use by the first shader function 24-1 for image rendering during the first period of time.

Figure 4:
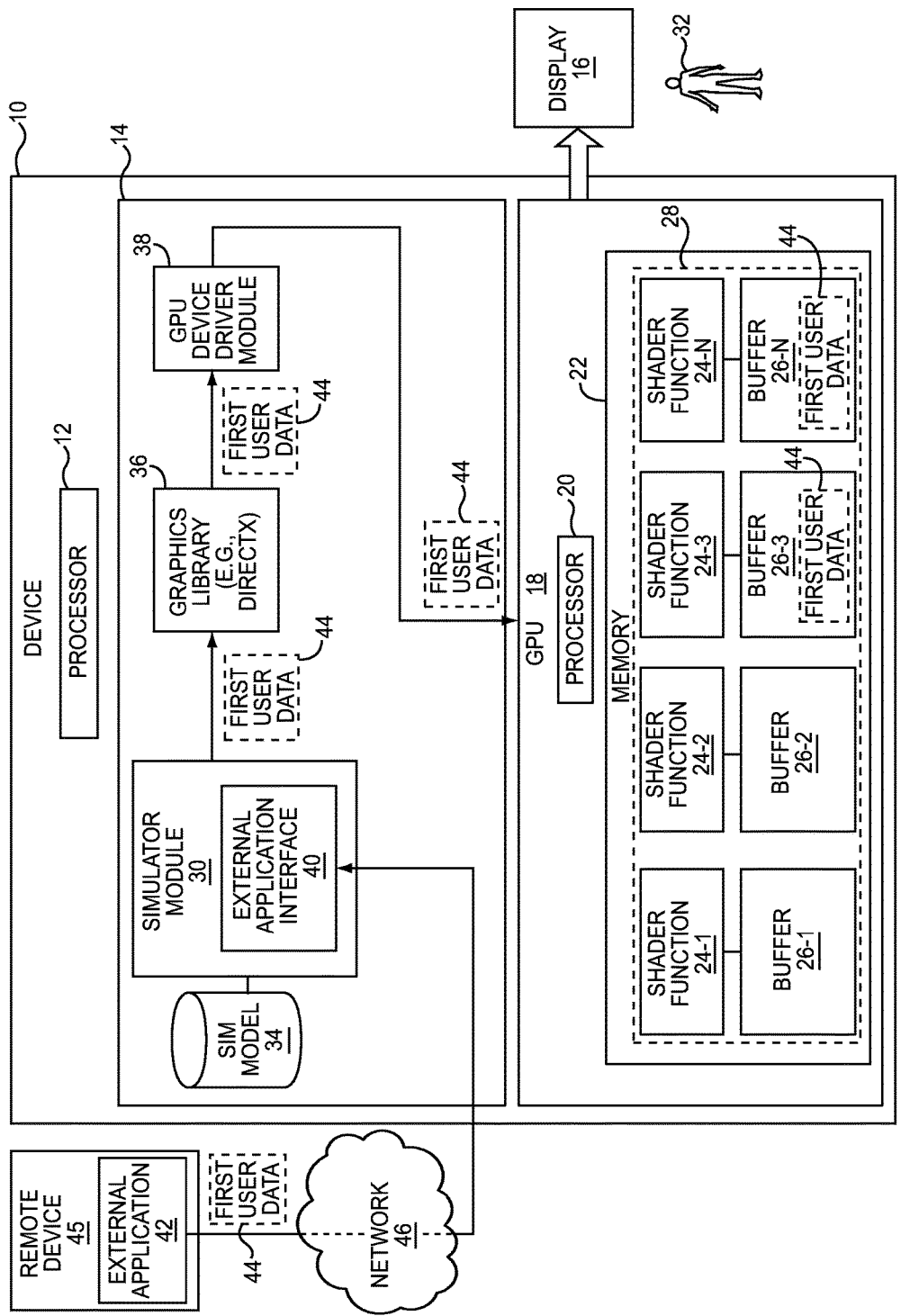
FIG. 4 is a block diagram illustrating a data flow according to another embodiment.

FIG. 4 is a block diagram illustrating a data flow according to another embodiment. In this embodiment the external application 42 executes on a remote device 45 which is communicatively coupled to the device 10 via a network 46. The external application 42 may communicate the first user data 44 via the network 46 to the simulator module 30. The simulator module 30 receives the first user data 44 from the external application 42 via the external application interface 40. The simulator module 30 provides the first user data 44 to the GPU 18 for use by the first shader function 24-1 for image rendering during the first period of time. During the first period of time, the simulator module 30 generates simulation data maintained in the simulation model 34 and provides the simulation data to the GPU 18 for image rendering.

Figure 5:
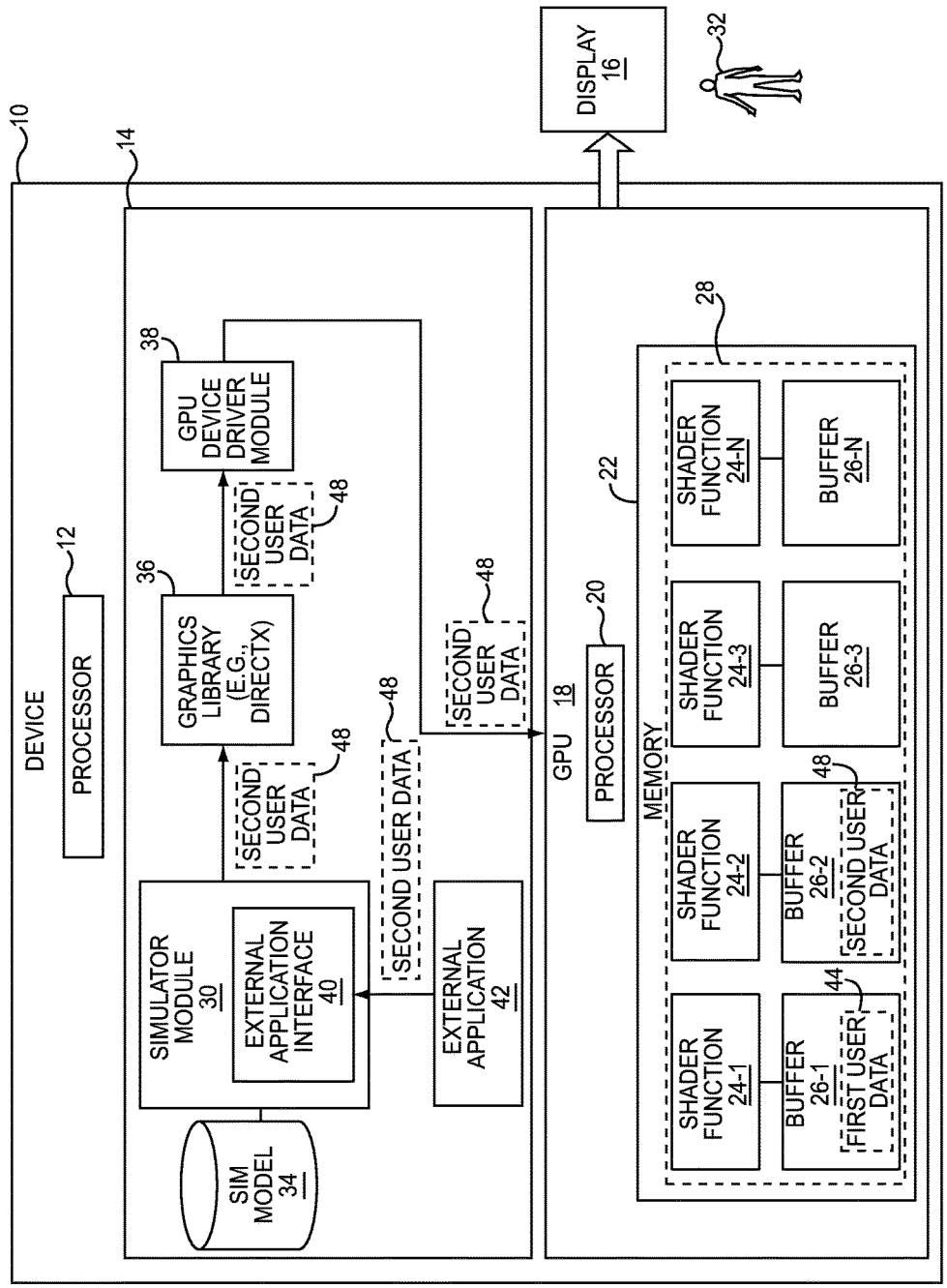
FIG. 5 is a block diagram illustrating additional data flow according to one embodiment.
Figure 6:
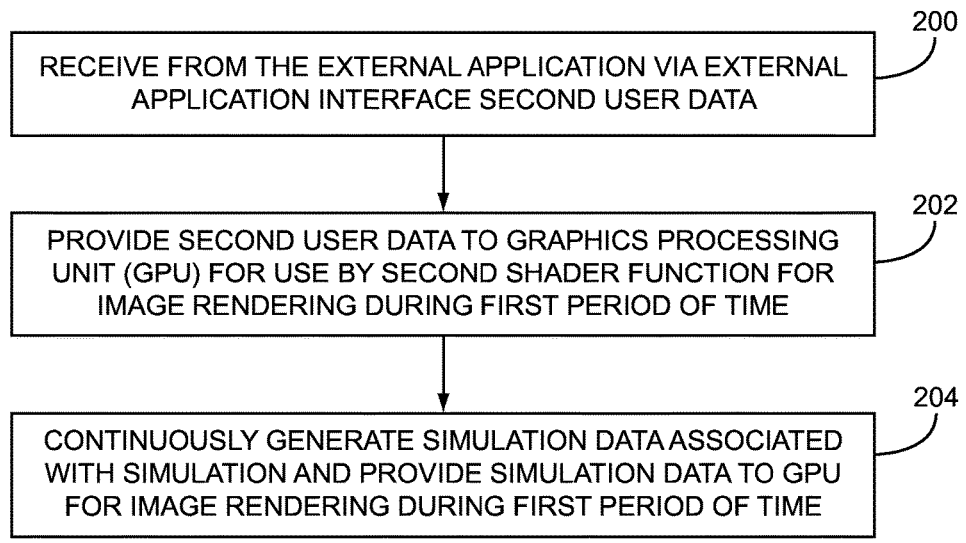
FIG. 6 is a flow chart of a method for directing a GPU to utilize multiple user data received from an external application according to one embodiment.

FIG. 5 is a block diagram illustrating additional data flow according to another embodiment. FIG. 6 is a flow chart of a method for facilitating the use of multiple user data by the GPU 18 that is provided by the external application 42 according to one embodiment. In this embodiment, the external application 42 may provide user data for multiple shader functions 24. Referring first to FIG. 6, the simulator module 30 receives second user data 48 from the external application 42 via the external application interface 40 (FIG. 6, block 200). The simulator module 30 provides the second user data to the GPU 18 for use by a second shader function 24-2 for image rendering during the first period of time (FIG. 6, block 202). The simulator module 30 continuously generates simulation data based on the simulation model 34 and provides the simulation data to the GPU 18 for image rendering during the first period of time (FIG. 6, block 204). During the first period of time, the first shader function 24-1 accesses the first user data 44 in the buffer 26-1 for rendering imagery, and the second shader function 24-2 accesses the second user data 48 in the buffer 26-2 for rendering the imagery.

Figure 7:
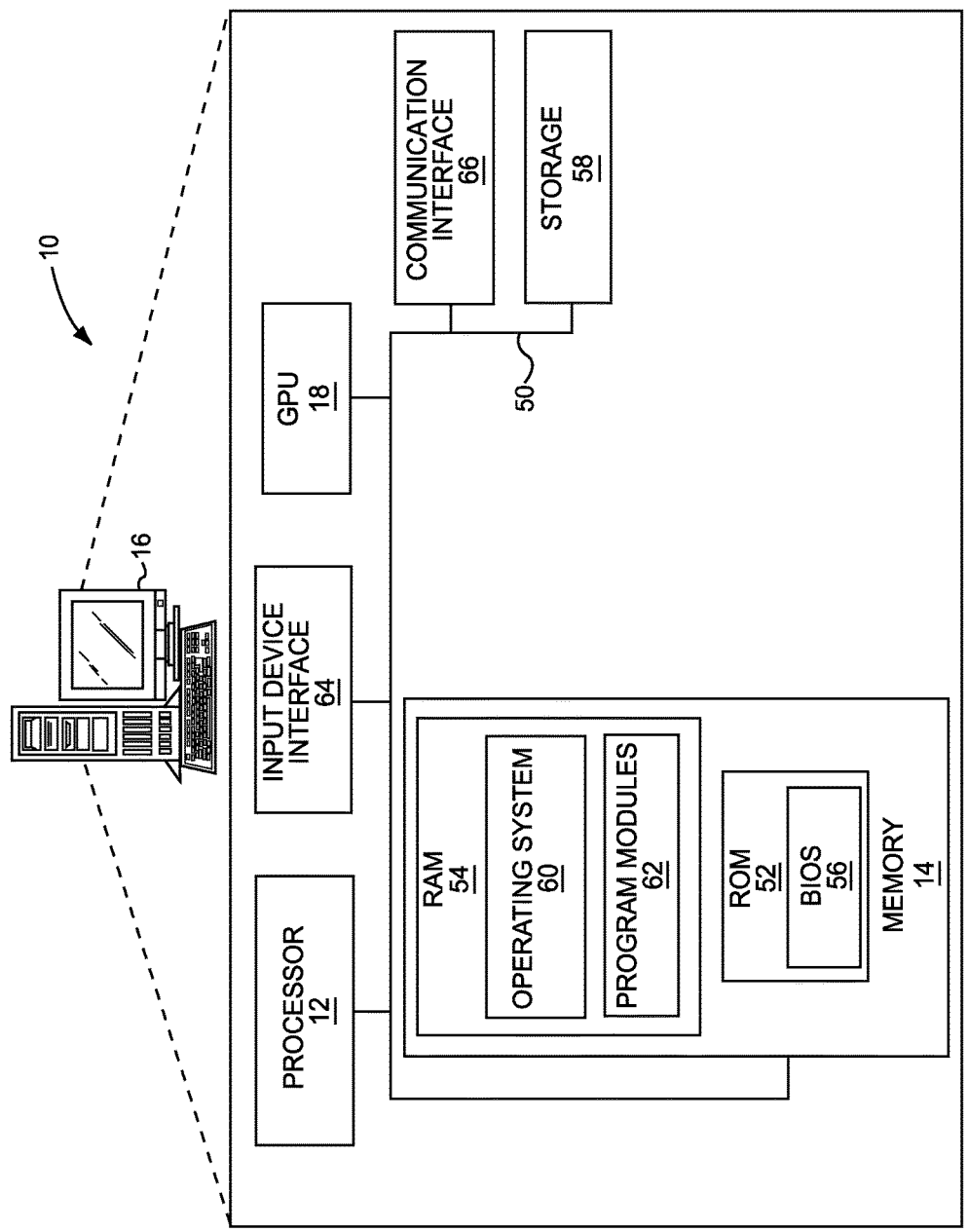
FIG. 7 is a block diagram of a device according to one embodiment.

FIG. 7 is a block diagram of the device 10 according to one embodiment. The device 10 may comprise any computing or processing device capable of executing software instructions to implement the functionality described herein, such as a work station, a desktop or laptop computer, a tablet computer, a special purpose simulator, a game console, or the like. The device 10 includes the processor 12, the memory 14, and a system bus 50. The system bus 50 provides an interface for system components including, but not limited to, the memory 14 and the processor 12. The processor 12 can be any commercially available or proprietary processor. Dual microprocessors and other multi-processor architectures may also be employed as the processor 12.

The memory 14 may include non-volatile memory 52 (e.g., read only memory (ROM), erasable programmable read only memory (EPROM), electrically erasable programmable read only memory (EEPROM), etc.) and/or volatile memory 54 (e.g., random access memory (RAM)). A basic input/output system (BIOS) 56 may be stored in the non-volatile memory 52, and can include the basic routines that help to transfer information between elements within the device 10. The volatile memory 54 may also include a high-speed RAM, such as static RAM for caching data.

The device 10 may further include a computer-readable storage 58, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 58 and other drives, associated with computer-readable and computer-usable media, provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 58 and in the volatile memory 54, including an operating system 60 and one or more program modules 62, which may implement the functionality described herein in whole or in part, including, for example, functionality associated with the simulator module 30, external application interface 40, external application 42, and other processing and functionality described herein. It is to be appreciated that the embodiments can be implemented with various commercially available operating systems 60 or combinations of operating systems 60.

All or a portion of the embodiments may be implemented as a computer program product stored on a transitory or non-transitory computer-usable or computer-readable storage medium, such as the computer-readable storage 58, which includes complex programming instructions, such as complex computer-readable program code, configured to cause the processor 12 to carry out the steps described herein. Thus, the computer-readable program code can comprise software instructions for implementing the functionality of the embodiments described herein when executed on the processor 12. The processor 12, in conjunction with the program modules 62, may serve as a control system for the device 10 that is configured to, or adapted to, implement the functionality described herein.

The user 32 may be able to enter commands and information into the device 10 through one or more input devices, such as, for example, a keyboard (not illustrated), a pointing device such as a mouse (not illustrated), or a touch-sensitive surface (not illustrated). Other input devices (not illustrated) may include a microphone, an infrared (IR) remote control, a joystick, a game pad, a stylus pen, or the like. These and other input devices may be connected to the processor 12 through an input device interface 64 that is coupled to the system bus 50, but can be connected by other interfaces such as a parallel port, an Institute of Electrical and Electronic Engineers (IEEE) 1394 serial port, a Universal Serial Bus (USB) port, an IR interface, and the like.

The device 10 may also include a communication interface 66 suitable for communicating with a network (not illustrated). The device 10 may also include the GPU 18 for rendering images, and communicating with the display 16.

Those skilled in the art will recognize improvements and modifications to the preferred embodiments of the present disclosure. All such improvements and modifications are considered within the scope of the concepts disclosed herein and the claims that follow.

What is claimed is:

1. A device, comprising:
   a memory; and
   a processor coupled to the memory and configured to:
   initiate a simulator module, the simulator module comprising a core module and an external application interface configured to communicate with an external application that is independent of the simulator module, wherein the external application comprises a different code base from the simulator module, the simulator module being configured to:
   receive, from the external application via the external application interface, first user data:
   provide the first user data to a graphics processing unit (GPU) for use by a first shader function for image rendering during a first period of time;
   direct the GPU to bind the first user data to a rendering pipeline for use by the first shader function for the image rendering during the first period of time; and
   continuously generate simulation data associated with a simulation and provide the simulation data to the GPU for the image rendering during the first period of time.

2. The device of claim 1, wherein to provide the first user data to the GPU for use by the first shader function for the image rendering during the first period of time, the simulator module is configured to communicate with a graphics library that interfaces with a device driver associated with the GPU.

3. The device of claim 2 wherein the graphics library comprises one of a DirectX® library, an OpenGL® library, and an OpenGL ES® library.

4. The device of claim 1, wherein the simulator module is further configured to:
   receive, from the external application via the external application interface, second user data;
   provide the second user data to the GPU for use by a second shader function for the image rendering during the first period of time;
   direct the GPU to bind the second user data to the rendering pipeline for use by the second shader function for the image rendering during the first period of time; and
   continuously generate the simulation data associated with the simulation and provide the simulation data to the GPU for the image rendering during the first period of time.

5. The device of claim 1, wherein the external application executes on a remote device communicatively coupled to the device via a network.

6. A method, comprising:
   providing, via a simulator module, an external application interface configured to communicate with an external application that is independent of the simulator module, wherein the external application comprises a different code base from the simulator module;
   receiving, by the simulator module from the external application via the external application interface, first user data;
   providing, by the simulator module, the first user data to a graphics processing unit (GPU) for use by a first shader function for image rendering during a first period of time;
   directing, by the simulator module, the GPU to bind the first user data to a rendering pipeline for use by the first shader function for the image rendering during the first period of time; and
   continuously generating, by the simulator module, simulation data associated with a simulation and providing the simulation data to the GPU for the image rendering during the first period of time.

7. The method of claim 6, wherein providing the first user data to the GPU for use by the first shader function for the image rendering during the first period of time, further comprises communicating with a graphics library that interfaces with a device driver associated with the GPU.

8. The method of claim 7 wherein the graphics library comprises one of a DirectX® library, an OpenGL® library, and an OpenGL ES® library.

9. The method of claim 6, further comprising:
   receiving, by the simulator module, from the external application via the external application interface, second user data;
   providing, by the simulator module, the second user data to the GPU for use by a second shader function for the image rendering during the first period of time;
   directing, by the simulator module, the GPU to bind the second user data to the rendering pipeline for use by the second shader function for the image rendering during the first period of time; and
   continuously generating, by the simulator module, the simulation data associated with the simulation and providing the simulation data to the GPU for the image rendering during the first period of time.

10. A computer program product stored on a non-transitory computer-readable storage medium and including instructions configured to cause a processor to carry out the steps of:
    providing, via a simulator module, an external application interface configured to communicate with an external application that is independent of the simulator module, wherein the external application comprises a different code base from the simulator module;
    receiving, by the simulator module from the external application via the external application interface, first user data;
    providing, by the simulator module, the first user data to a graphics processing unit (GPU) for use by a first shader function for image rendering during a first period of time;
    directing, by the simulator module, the GPU to bind the first user data to a rendering pipeline for use by the first shader function for the image rendering during the first period of time; and
    continuously generating, by the simulator module, simulation data associated with a simulation and providing the simulation data to the GPU for the image rendering during the first period of time.

11. The computer program product of claim 10, wherein the instructions are further configured to cause the processor to carry out the steps of:
    receiving, from the external application via the external application interface, second user data;
    providing, by the simulator module, the second user data to the GPU for use by a second shader function for the image rendering during the first period of time;

directing, by the simulator module, the GPU to bind the second user data to the rendering pipeline for use by the second shader function for the image rendering during the first period of time; and continuously generating the simulation data associated with the simulation and providing the simulation data to the GPU for the image rendering during the first period of time.

\* \* \* \* \*